Patented Jan. 9, 1951

2,537,622

UNITED STATES PATENT OFFICE 2,537,622

PROCESS OF PREPARING SUBSTITUTED ALLYL ALCOHOLS

John Mann Butler, Dayton, Ohio, assignor to Monsanto Chemical Company, St. Louis, Mo., a corporation of Delaware No Drawing. Application August 26, 1948, Serial No. 46,365

4 Claims. (Cl. 260—618)

This invention relates to a new family of polymerizable compounds and to a novel method for preparing them. More specifically the invention relates to substituted allyl alcohols having chemical properties and uses quite distinguishable of allyl alcohol.

The oxidation of α-methyl styrene to acetophenone is well known. The purpose of this invention is to provide a different oxidation method whereby α-methyl styrene is converted to β-phenylallyl derivatives. A further purpose of this invention is to provide a new family of substituted phenylallyl esters and alcohols and methods for their preparation.

The new alcohols have the structure:

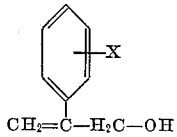

wherein X is hydrogen, halogen, alkyl or phenyl. In this structural formula the alkyl substituent is preferably one having up to four carbon atoms, for example methyl, ethyl, isopropyl, n-propyl, n-butyl, isobutyl, and t-butyl, and the halogen, chlorine, bromine, fluorine or iodine.

The new compounds may be prepared by oxidation of α-methyl styrene, or other isopropenyl substituted aromatic hydrocarbons by means of selenium dioxide. Suitable isopropenyl aromatics are p-chloroisopropenyl benzene, p-isopropenyl biphenyl, p-methyl isopropenyl benzene, and the isomeric meta- and ortho-derivatives. The reaction is conducted in the presence of an anhydride of a carboxylic acid, for example acetic anhydride or propionic anhydride, and in the presence of a suitable solvent, for example glacial acetic acid. The reaction requires heat for its initiation, however, excessive temperatures should be avoided. Since the reaction is exothermic in nature it is necessary to remove some heat during the reaction by means of suitable cooling. As the reaction approaches completion gradually increased temperatures may be used, reaching a maximum of approximately 130 to 150° C. after two to three hours. The solid precipitate formed during the reaction is then separated from the liquid by filtration or decantation, and the liquid steam distilled. The organic distillate is separated from the water phase and redistilled at reduced pressures to isolate the esters of the phenylallyl alcohol and the carboxylic acid corresponding to the anhydride used.

The phenylallyl alcohol is readily prepared from the ester by hydrolysis or by alcoholysis. The resulting β-phenylallyl alcohol may further be separated from its impurities by vacuum distillation.

The new substituted allyl alcohols are useful as monomers for the preparation of polymers, as intermediates, and as perfumes. Although allyl alcohol is not polymerizable and its derivatives polymerize only with difficulty, the β-phenylallyl alcohol and its ring substituted derivatives are polymerizable and are capable of copolymerization with a wide variety of active monomers.

Further details of the practice of this invention are set forth with respect to the following specific examples.

Example 1

A glass reaction vessel was provided with a thermometer, a rotary stirring mechanism, a water cooled condenser, and charged with 236 parts by weight of α-methyl styrene in 158 parts of acetic anhydride and 108 parts of acetic acid. The vessel and its contents were gradually heated to 45° C. and 80 parts by weight of finely divided selenium dioxide was gradually added over a thirty minute period. The reaction temperature increased to approximately 100° C. and a water bath was used to reduce the temperature to a maximum of 80° C. The temperature was then maintained between 70 and 80° C. for one hour and then from 120 to 130° C. for two additional hours. The precipitate was removed from the reaction flask by decantation and the liquid was steam distilled. After separation from the water the organic fraction was distilled at 9 mm. pressure and 115 to 116° C. The resulting product was identified as β-phenylallyl acetate.

Example 2

The β-phenylallyl acetate prepared in the preceding experiment was refluxed in ethyl alcohol in the presence of 50 percent by weight of the ester of sodium hydroxide for two and one-half hours. The reaction mass was then diluted with an equal volume of water and the mixture extracted with ether. The combined extracts were then distilled and the product boiled from 114 to 115° C. at 10 mm. pressure was identified as 2-phenylallyl alcohol.

The invention is defined by the following claims.

I claim:

1. A method of preparing substituted allyl alcohols which comprises oxidizing isopropenyl substituted aromatic compounds having the structure:

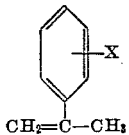

wherein X is a radical of the group consisting of hydrogen, halogen, alkyl and phenyl with selenium dioxide in the presence of an anhydride of a carboxylic acid and hydrolyzing the resulting product.

2. A method of preparing β-phenylallyl alcohol which comprises heating α-methyl styrene with selenium dioxide in the presence of acetic anhydride, hydrolyzing the product so formed, and separating the phenylallyl alcohol by vacuum distillation.

3. A method of preparing β-p-chlorophenylallyl alcohol which comprises heating α-methyl p-chlorostyrene with selenium dioxide in the presence of acetic anhydride, hydrolyzing the product so formed, and separating the alcohol by vacuum distillation.

4. A method of preparing β-p-biphenylallyl alcohol which comprises heating α-methyl β-phenylstyrene with selenium dioxide in the presence of acetic anhydride, hydrolyzing the product so formed, and separating the alcohol by vacuum distillation.

JOHN MANN BUTLER.

REFERENCES CITED

The following references are of record in the file of this patent:

FOREIGN PATENTS

| Number | Country | Date |
|---|---|---|
| 566,344 | Great Britain | Dec. 27, 1944 |